Feb. 13, 1951 D. F. HACK 2,541,244
CARRIER ATTACHMENT FOR AUTOMOBILES
Filed Aug. 26, 1949
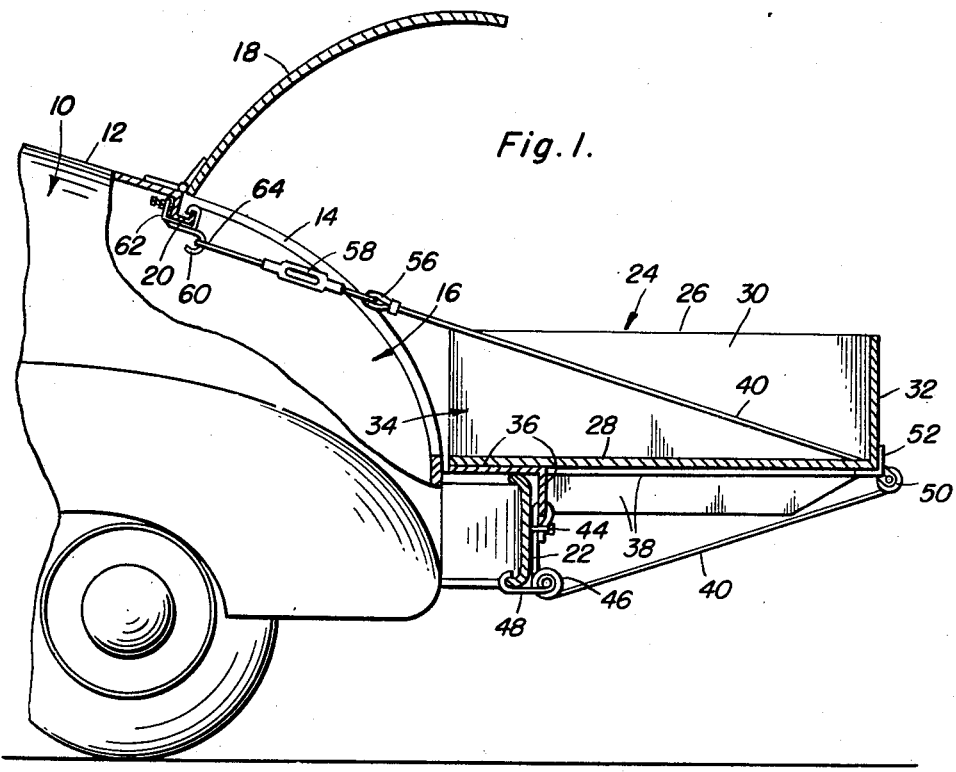
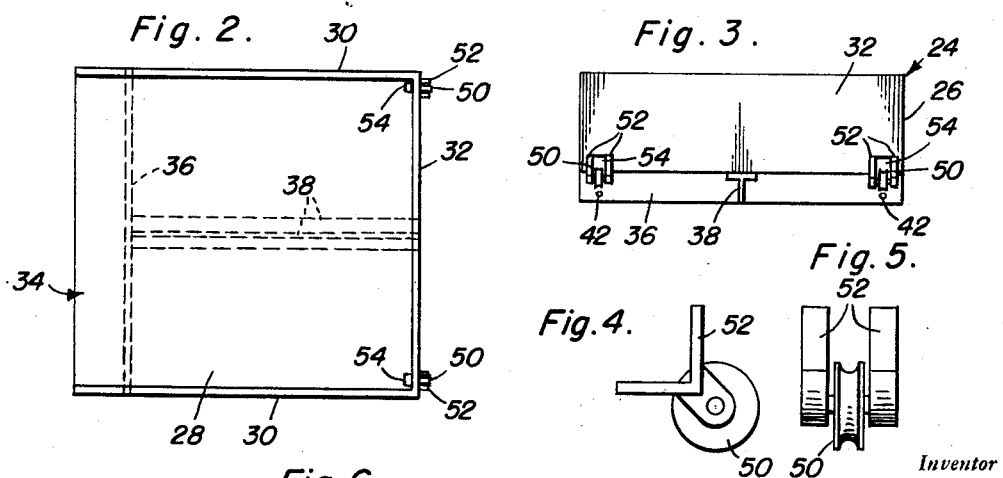
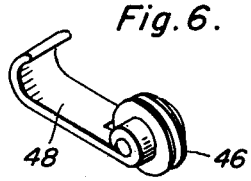
Inventor
David F. Hack Patented Feb. 13, 1951

2,541,244

UNITED STATES PATENT OFFICE 2,541,244

CARRIER ATTACHMENT FOR AUTOMOBILES

David F. Hack, Danbury, Conn.

Application August 26, 1949, Serial No. 112,619

7 Claims. (Cl. 224—42.43)

This invention relates to new and useful improvements and structural refinements in carrier attachments for automobiles and similar vehicles, and the principal object of the invention is to facilitate transportation of luggage, et cetera, which cannot be totally accommodated in the usual trunk compartment of the vehicle.

This object is achieved by the provision of the instant carrier which is adapted for attachment to the rear portion of an automobile body in such manner that in effect, it constitutes a continuation of the trunk compartment, an important feature of the invention residing in the provision of means for firmly and securely, yet detachably fastening the carrier in position on the automobile body.

Some of the advantages of the invention reside in its simplicity of construction and in the fact that it can be conveniently stored in the trunk compartment when it is not in use.

Other advantages of the invention lie in its pleasing appearance, in its adaptability for use in association with automobiles of different types, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a cross-sectional view of the invention in situ on an automobile body;

Figure 2 is a top plan view of a receptacle used in the invention;

Figure 3 is a rear elevational view of the receptacle shown in Figure 2;

Figure 4 is a side elevational view of one of the guide pulleys and brackets used in the invention;

Figure 5 is a rear elevational view of the subject shown in Figure 4, and

Figure 6 is a perspective view of another guide pulley and bracket used in the invention.

Like characters of reference are employed to designate like parts in the specification and throughout the several views.

Referring now to the accompanying drawings in detail, the general reference character 10 designates a vehicle such as an automobile, the same having a body provided in the rear portion thereof with the usual trunk door opening 14 leading to a trunk compartment 16, a hinged, upwardly swingable closure door 18 being of course provided for the opening 14, as will be readily understood.

It is to be noted that the body 12 is formed with the customary flange or reinforcement 20 at the upper edge of the trunk opening 14, while the usual bumper bar 22 is disposed at the rear end of the body adjacent the lower edge of the opening, as illustrated in Figure 1.

The invention resides in the provision of a carrier attachment designated generally by the reference character 24, the same consisting of a box-shaped receptacle 26 including a bottom 28, a pair of side walls 30 and an end wall 32, it being noted that the front of the receptacle is open, as at 34.

For purposes of reinforcement, a transverse angle 36 and a longitudinal angle 38 may be secured to the underside of the receptacle bottom 28, the entire receptacle being adapted for attachment to the vehicle body by having the front edge portion of the bottom 28 positioned on the upper edge of the bumper bar 22, as shown in Figure 1. In effect, it is the horizontal web of the angle 36 which actually rests upon the upper edge of the bumper bar, but for purposes of explanation the angles 36, 38 may well be considered as constituting components of the bottom 28, as will be clearly understood.

It will be apparent from the foregoing that the receptacle 26, that is, the bottom 28 of the receptacle is disposed substantially at the level of the bottom edge of the opening 14 and that, by virtue of the open front 34 of the receptacle, the latter constitutes a continuation of the trunk compartment 16.

Means are provided for removably mounting the receptacle 26 on the automobile body, these means consisting of a pair of elements or cables 40 which are looped through apertures 42 provided in the end portions of the angle 36 and are secured therein by suitable clamps 44, these cables extending downwardly and passing around a pair of guide pulleys 46 which are rotatably mounted in hook-shaped brackets 48. The hook portions of these brackets are engageable with the lower edge of the bumper bar 22, and after passing around the pulleys 46, the cables 40 extend rearwardly and upwardly to engage further guide pulleys 50.

The guide pulleys 50 are rotatably mounted by angle brackets 52 at the rear lower edge of the receptacle 26, that is, at the junction of the rear wall 32 with the bottom 28, and the rear wall 32 is provided with recesses or openings 54 through which the cables 40 may extend upwardly and forwardly toward the reinforcing flange 20 of the automobile body 12.

The upper forward portions of the cables 40 are, in turn, connected as at 56 to conventional turnbuckles 58, which, in turn, are connected to suitable hooks 60 secured to C-clamps 62 positioned on the flange 20.

It will be apparent from the foregoing that by tightening the turnbuckles 58 the receptacle 26 will be drawn by the cables 40 in a forward as well as a downward direction into engagement with the bumper bar 22, so that it will be rigidly supported in position.

When the use of the carrier attachment is not desired, the clamps 62 may be simply removed from the flange 20 and the pulley brackets 48 may be disengaged from the lower edge portion of the bumper bar 22, after which the entire receptacle 26 may be simply lifted from the bumper bar and stored in the trunk compartment 16.

If desired, the end portions 64 of the turnbuckles 58 may assume the form of hooks in place of conventional eyes, so that the turnbuckles may be disconnected from the hooks 60 without removing the clamps from the flange 20. In such instance, the clamps 62 and hooks 60 may be permitted to remain on the flange after the attachment is stored in the trunk compartment and the trunk door or lid 18 is closed, this being possible, of course, because the clamps 62 and hooks 60 do not project outwardly from the trunk opening 14.

It is believed that the advantages and use of the invention will be clearly understood from the foregoing disclosure and accordingly, further description thereof at this point is deemed unnecessary.

Having described the invention, what is claimed as new is:

1. In combination with an automobile body provided with a rear bumper bar, a carrier attachment comprising a box-shaped receptacle having a front edge portion positioned on said bar, a guiding member provided at the rear edge of said receptacle, and a flexible fastening element having one end portion thereof connected to said bar at a point substantially below said receptacle and passing over said member, the remaining end portion of said element extending forwardly and upwardly from said member and being secured to said body at a point substantially above said bumper bar.

2. The device as defined in claim 1 together with means for connecting said element to said bar.

3. The device as defined in claim 1 together with means for attaching said element to said body.

4. The device as defined in claim 1 wherein said guiding member includes a rotatable pulley engaged by said element.

5. In combination with an automobile body provided in the rear portion thereof with a trunk opening and equipped with a bumper bar adjacent the lower edge of said opening, a carrier attachment comprising a box-shaped receptacle having a front edge portion positioned on the upper edge of said bar, a rotatable guide pulley mounted at the rear edge of said receptacle, a flexible element having an intermediate portion thereof in engagement with said pulley, one end portion of said element extending forwardly and downwardly from the pulley and being connected to the lower edge portion of said bar, the remaining end portion of the element extending forwardly and upwardly from said pulley and being connected to said body at the upper edge of said opening, and means for stretching said element over said pulley whereby said receptacle may be firmly retained in position.

6. The device as defined in claim 5 wherein said receptacle includes a rear wall provided with a recess adjacent said pulley, the forwardly and upwardly extending portion of said element passing through said recess.

7. The device as defined in claim 5 together with an additional guide pulley mounted on the lower edge portion of said bar, the forwardly and downwardly extending portion of said element passing around said last mentioned pulley and having the extremity thereof secured to the bottom of said receptacle.

DAVID F. HACK.

REFERENCES CITED

The following references are of record in the file of this patent:

UNITED STATES PATENTS

| Number | Name | Date |
| --- | --- | --- |
| 1,415,244 | Kennedy | May 9, 1922 |
| 2,065,833 | Stratton et al. | Dec. 29, 1936 |
| 2,394,447 | Hemp | Feb. 5, 1946 |